(12) United States Patent
Song et al.

(10) Patent No.: US 11,664,512 B2
(45) Date of Patent: May 30, 2023

(54) METHODS AND SYSTEM FOR REDOX FLOW BATTERY IDLE STATE

(71) Applicant: ESS Tech, Inc., Wilsonville, OR (US)

(72) Inventors: Yang Song, West Linn, OR (US); Timothy J. McDonald, Portland, OR (US); Kenneth Fisher, Tigard, OR (US)

(73) Assignee: ESS Tech, Inc., Wilsonville, OR (US)

( * ) Notice: Subject to any disclaimer, the term of this patent is extended or adjusted under 35 U.S.C. 154(b) by 0 days.

(21) Appl. No.: 17/308,890

(22) Filed: May 5, 2021

(65) Prior Publication Data

US 2021/0359315 A1    Nov. 18, 2021

Related U.S. Application Data

(60) Provisional application No. 63/025,240, filed on May 15, 2020.

(51) Int. Cl.
| | |
|---|---|
| *H01M 8/04276* | (2016.01) |
| *H01M 8/04298* | (2016.01) |
| *H01M 8/18* | (2006.01) |
| *H01M 8/04119* | (2016.01) |

(52) U.S. Cl.
CPC ... *H01M 8/04283* (2013.01); *H01M 8/04119* (2013.01); *H01M 8/04298* (2013.01); *H01M 8/188* (2013.01)

(58) Field of Classification Search
CPC ......... H01M 8/04283; H01M 8/04119; H01M 8/04298; H01M 8/188
See application file for complete search history.

(56) References Cited

U.S. PATENT DOCUMENTS

| | | | |
|---|---|---|---|
| 6,692,862 B1 | 2/2004 | Zocchi | |
| 7,220,515 B2 | 5/2007 | Ito et al. | |
| 7,800,345 B2 | 9/2010 | Yun et al. | |
| 9,509,011 B2 | 11/2016 | Evans et al. | |
| 10,181,615 B2 | 1/2019 | Song et al. | |
| 10,680,263 B2 | 6/2020 | Song et al. | |
| 2015/0155585 A1* | 6/2015 | Hopkins ............... | H01M 8/188 |
| | | | 429/418 |
| 2018/0316031 A1 | 11/2018 | Song et al. | |
| 2018/0316032 A1* | 11/2018 | Song ................. | H01M 8/04201 |

(Continued)

FOREIGN PATENT DOCUMENTS

| | | |
|---|---|---|
| WO | 2013096276 A1 | 6/2013 |
| WO | 2014088601 A1 | 6/2014 |
| WO | 2018201079 A1 | 11/2018 |

OTHER PUBLICATIONS

ISA Korean Intellectual Property Office, International Search Report and Written Opinion Issued in Application No. PCT/US2021/031179, dated Aug. 24, 2021, WIPO, 13 pages.

*Primary Examiner* — Brian R Ohara
*Assistant Examiner* — Aaron J Salter
(74) *Attorney, Agent, or Firm* — McCoy Russell LLP

(57) ABSTRACT

Methods and systems are provided for a redox flow battery system. In one example, a method of operating a redox flow battery system includes switching the redox flow battery system to an idle mode and completely draining electrolytes from one or more electrode compartments of the redox flow battery system. The one or more electrode compartments may be purged with a gas and refilled with fresh electrolytes.

16 Claims, 7 Drawing Sheets

(56) References Cited

U.S. PATENT DOCUMENTS

| | | |
|---|---|---|
| 2018/0316033 A1 | 11/2018 | Evans |
| 2018/0316035 A1 | 11/2018 | Song et al. |
| 2018/0316037 A1 | 11/2018 | Song et al. |
| 2019/0341641 A1 | 11/2019 | Tomita |
| 2020/0040511 A1* | 2/2020 | Scheckelhoff .......... D06F 33/42 |

* cited by examiner

METHODS AND SYSTEM FOR REDOX FLOW BATTERY IDLE STATE

CROSS REFERENCE TO RELATED APPLICATIONS

The present application claims priority to U.S. Provisional Application No. 63/025,240, entitled "METHODS AND SYSTEM FOR REDOX FLOW BATTERY IDLE STATE," and filed on May 15, 2020. The entire contents of the above-identified application are hereby incorporated by reference for all purposes.

FIELD

The present description relates generally to methods and systems for a redox flow battery.

BACKGROUND AND SUMMARY

Redox flow batteries are suitable for grid scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low-cost, earth-abundant materials. Iron redox flow batteries (IFBs) rely on iron, salt, and water for electrolyte, thus including simple, earth-abundant, and inexpensive materials, and eliminating incorporation of harsh chemicals, thereby allowing the IFB to have a reduced impact on the environment.

However, the inventors herein have recognized potential issues with such systems. Namely, a redox flow battery in a charged state may lose energy storage capacity while sustaining idle mode much faster than a traditional battery in an analogous charged state (e.g., while similarly sustaining idle mode). In particular, redox flow battery systems may lose capacity by way of shunt current losses through the conductive electrolytes and from ionic movement through the membrane. Continuously cycling fresh electrolyte to battery cells of the redox flow battery system, such as during idle operation of the redox flow battery, may maintain such shunting losses at higher levels. Furthermore, the redox flow battery system may suffer from parasitic power losses due to continuous pumping and heating of the electrolyte at charging/discharging levels during the idle state, including pumping parasitic loss and heating parasitic loss. Alternatively, periodic (e.g., as opposed to continuous) cycling of fresh electrolyte to the battery cells may at least partially inhibit capacity loss in single cell systems but may exacerbate shunting losses in larger battery modules.

In one embodiment, the issues described above may be at least partially addressed by a method of operating a redox flow battery system, the method including, responsive to switching the redox flow battery system to an idle mode, wherein the idle mode includes operation of the redox flow battery system outside of a charging mode and outside of a discharging mode, completely draining electrolytes from one or more electrode compartments of the redox flow battery system, purging the one or more electrode compartments with a gas, and refilling the one or more electrode compartments with fresh electrolytes. In this way, the technical effect can be achieved of maintaining a responsiveness of the redox flow battery system to charging and discharging commands while in the idle mode, while reducing parasitic power losses due to pumping and heating, and reducing shunt current losses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
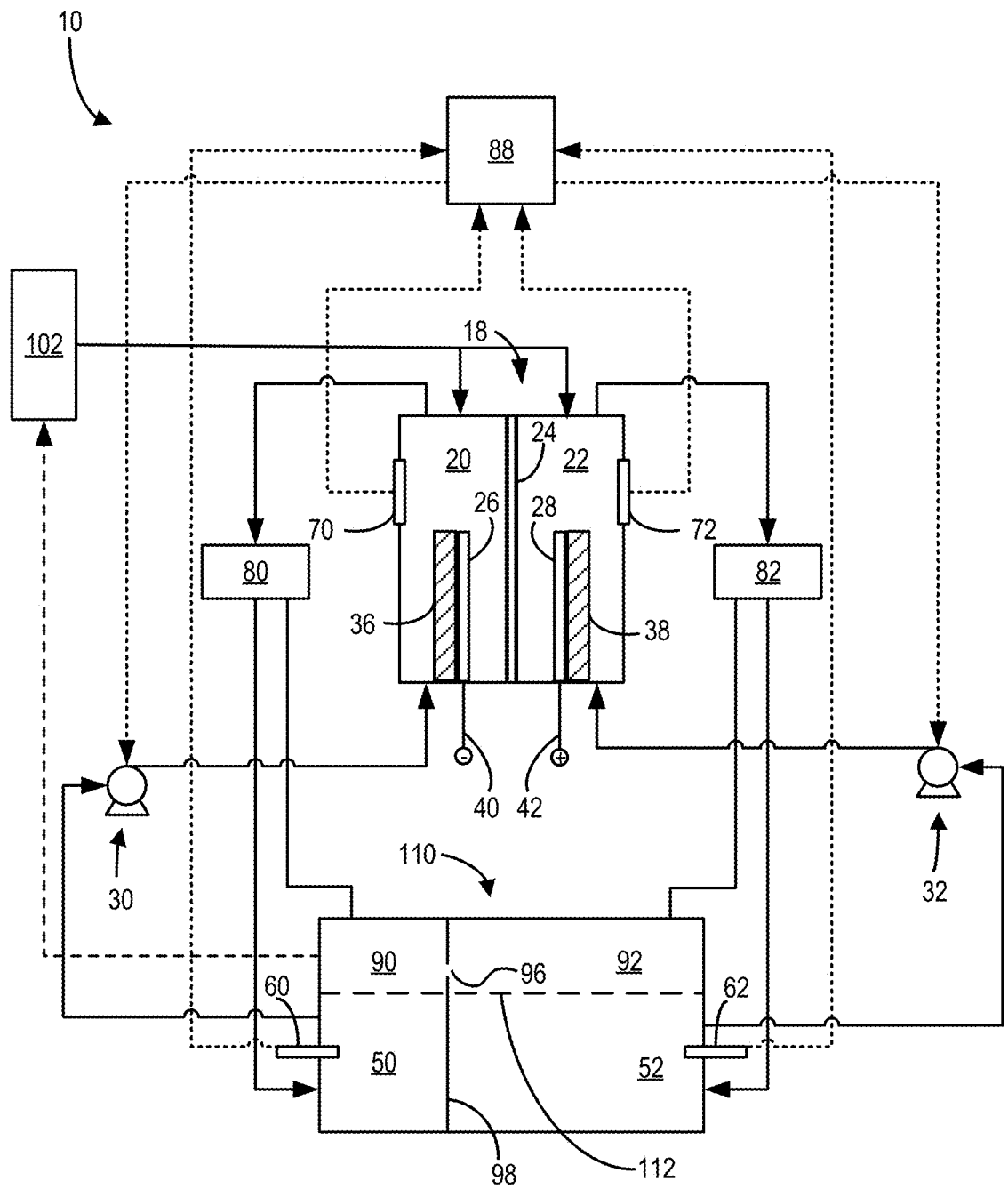
FIG. 1 shows a schematic of an example redox flow battery system including a battery cell with electrodes and a membrane separator.
Figure 3:
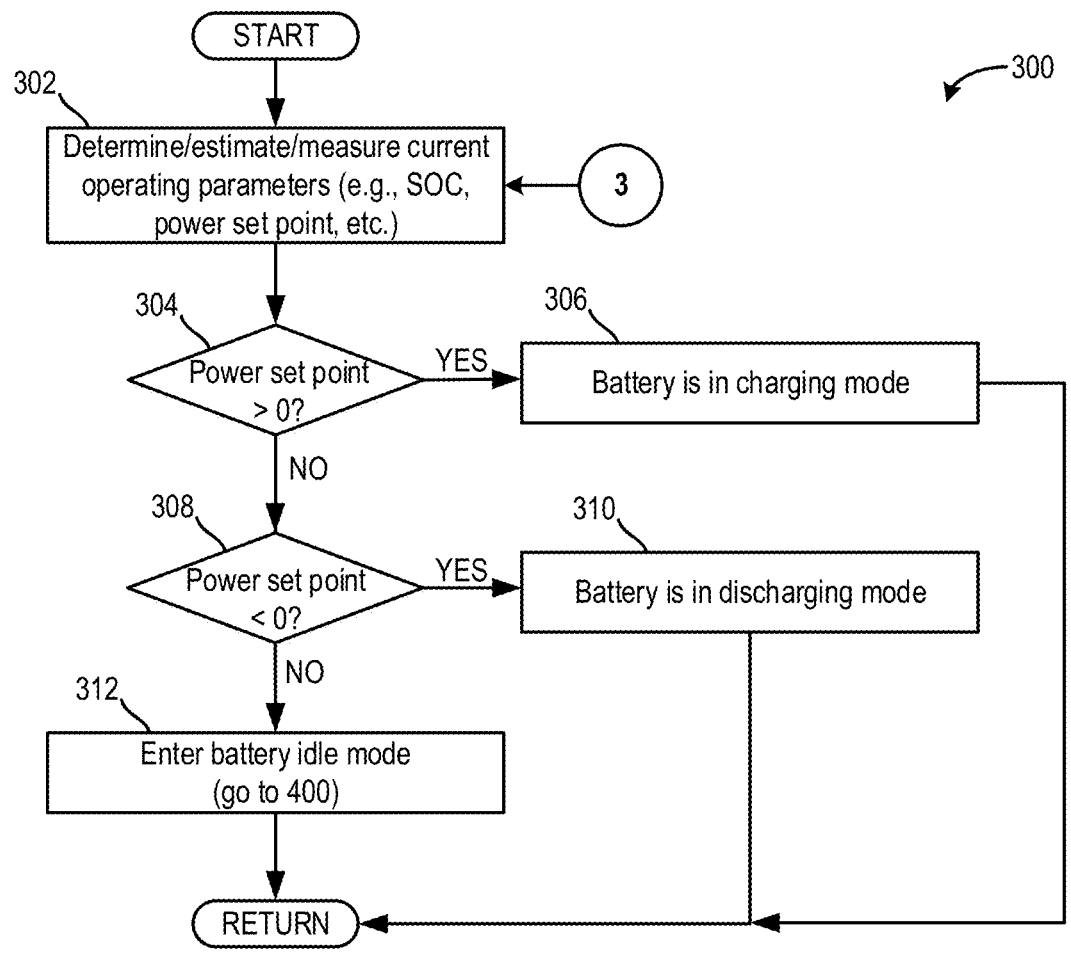
FIG. 3 shows a high level flow chart of an example method for operating the redox flow battery system of FIG. 1.
Figure 4:
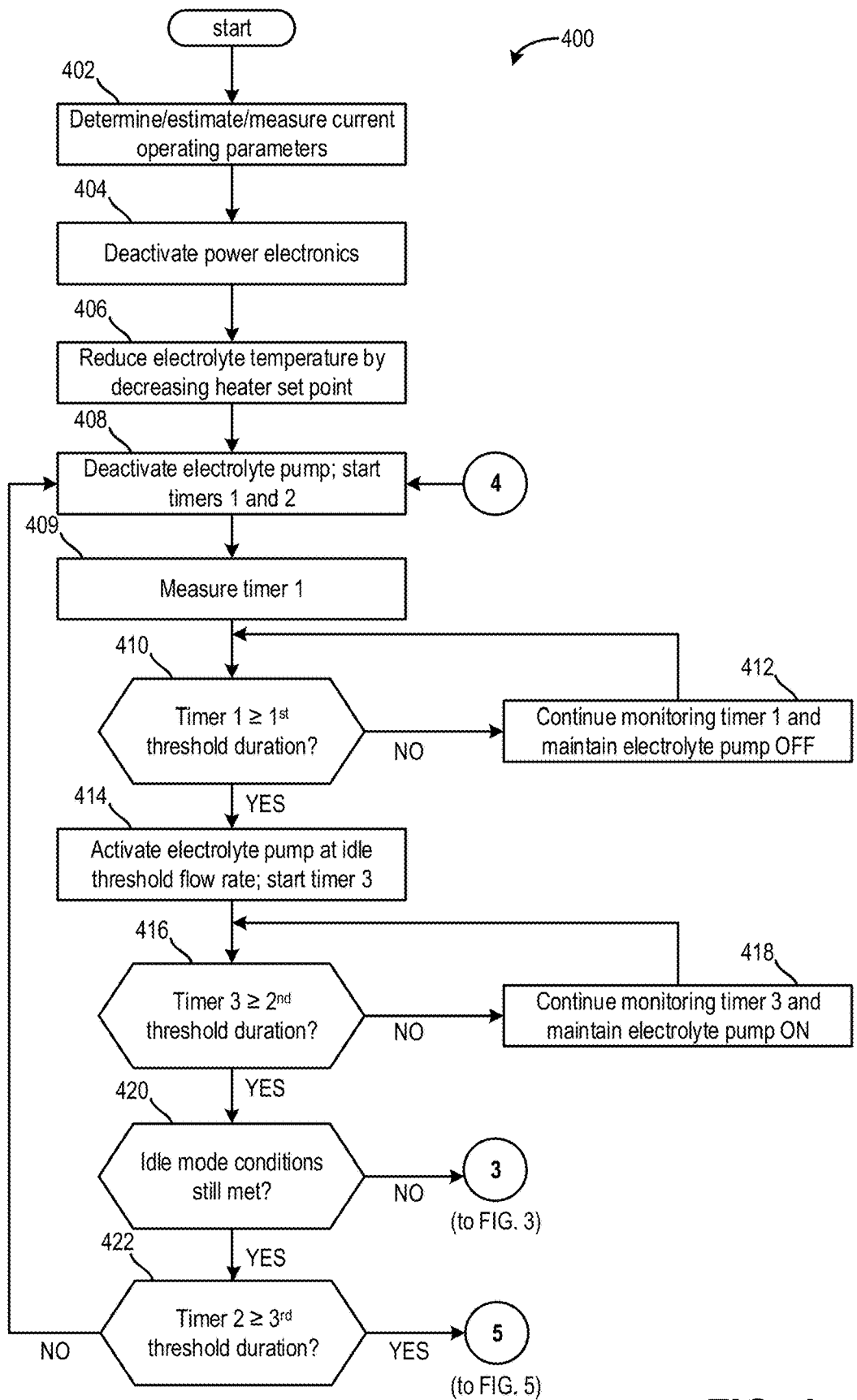
FIG. 4 shows a first example method for operating the redox flow battery system of FIG. 1 in an idle mode.
Figure 5:
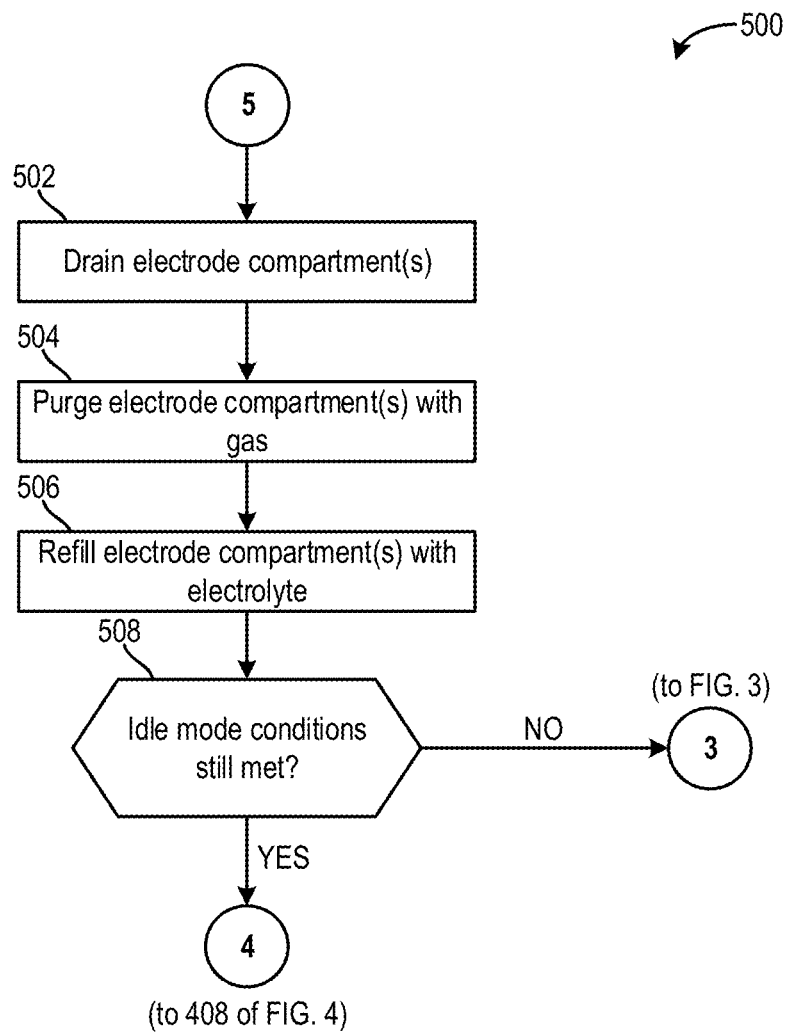
FIG. 5 shows a second example method for operating the redox flow battery system of FIG. 1 in the idle mode.
Figure 6:
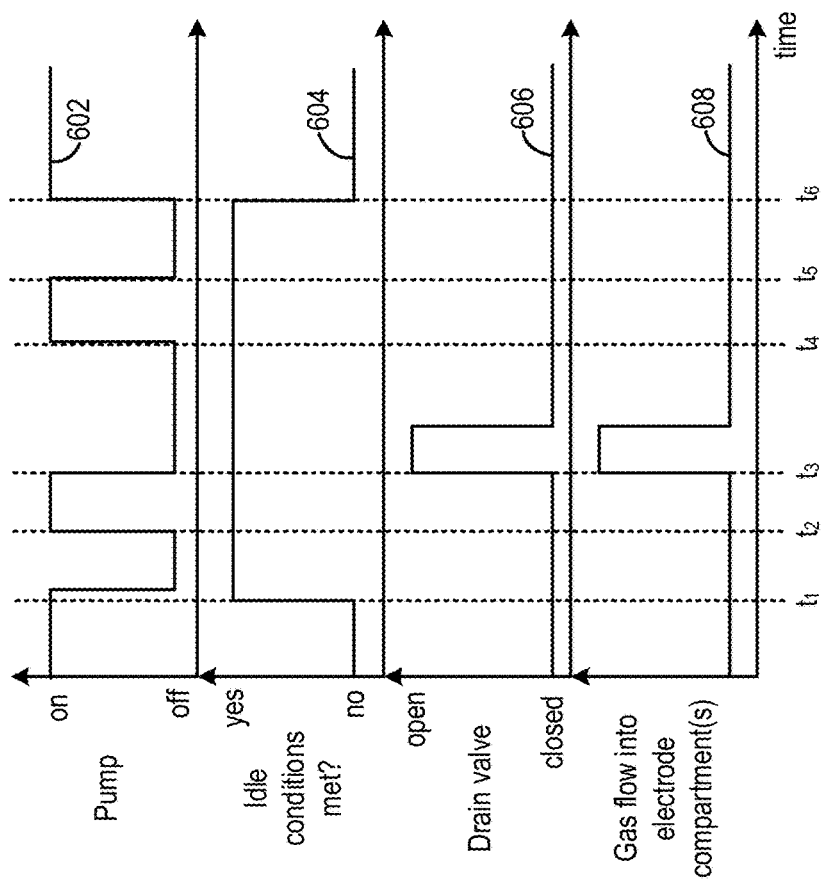
FIG. 6 shows a timeline plot illustrating operation of the redox flow battery system of FIG. 1 in the idle mode.
Figure 7:
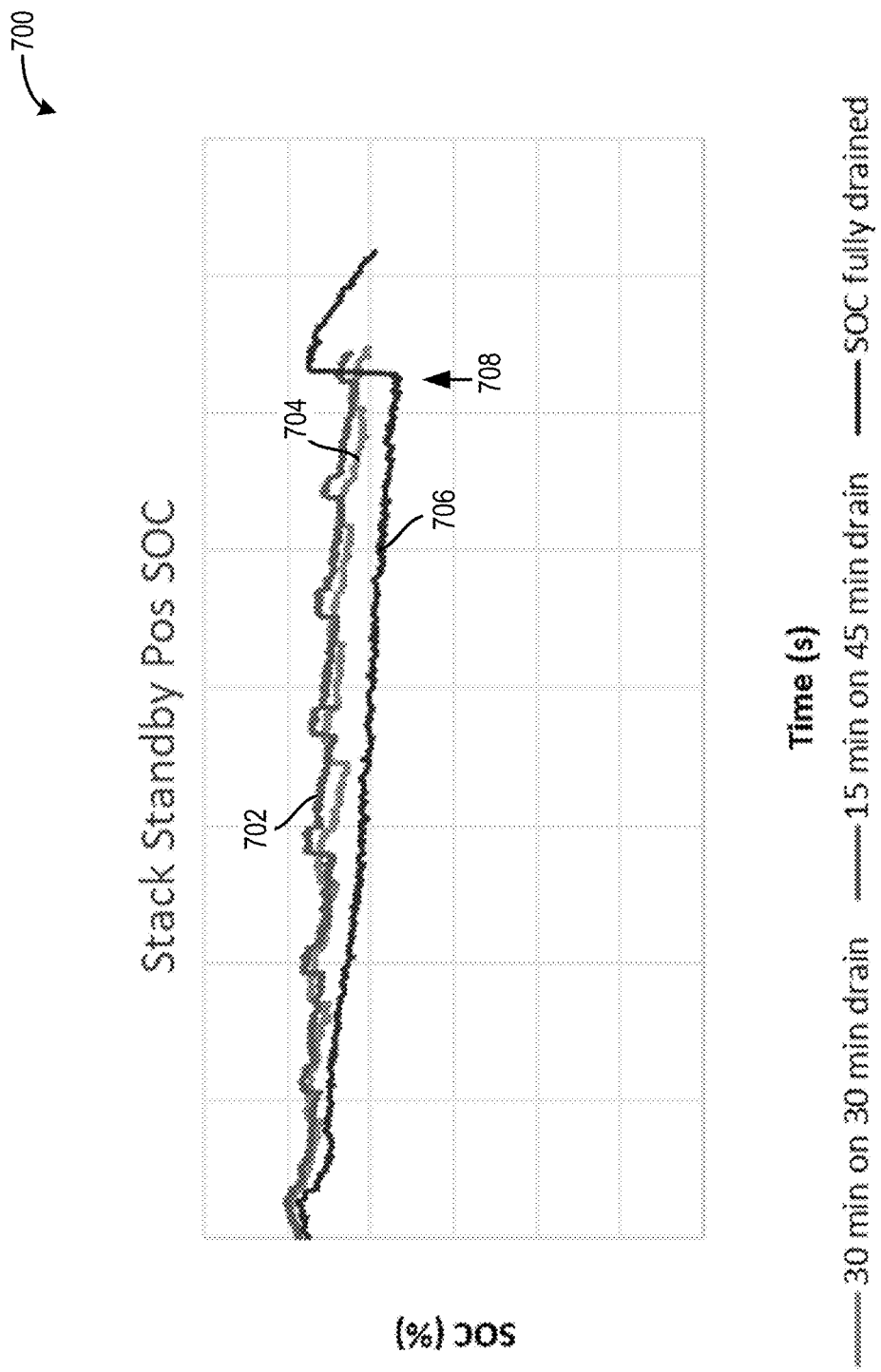
FIG. 7 shows a graph comparing a battery state of charge during an idle mode with time.

The following description relates to systems and methods for manufacturing a redox flow battery with reduced cost of storage. The redox flow battery is shown in FIG. 1 with an integrated multi-chamber tank having separate positive and negative electrolyte chambers. In some examples, the redox flow battery may be an all-iron flow battery (IFB) utilizing iron redox chemistry at both a negative electrode and a positive electrode of the IFB. The electrolyte chambers may be coupled to one or more battery cells, each cell including the negative electrode and the positive electrode. The redox flow battery may be arranged in a layout including a housing and various other components as shown in a side view in FIG. 2. An example of a method for operating the redox flow battery is depicted in FIG. 3. FIGS. 4 and 5 are examples of methods for operating the redox flow battery when the battery is in an idle mode. Adjustments to components of the redox flow battery during operation in the idle mode are depicted in FIG. 6. Effects of the methods shown in FIGS. 4 and 5 on battery state of charge (SOC) are illustrated in FIG. 7 in a graph plotting SOC against time.

Hybrid redox flow batteries are redox flow batteries that are characterized by the deposition of one or more electroactive materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid redox flow battery systems, the charge capacity (e.g., a maximum amount of energy stored) of the redox flow battery may be limited by the amount of metal plated during battery charge and may depend accordingly on the efficiency of the plating system as well as the available volume and surface area available for plating.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to the electrode where electroactive material loses electrons and "cathode" refers to the electrode where electroactive material gains electrons. During battery charge, the negative electrolyte gains electrons at the negative electrode 26; therefore the negative electrode 26 is the cathode of the electrochemical reaction. During discharge, the negative electrolyte loses electrons; therefore the negative electrode 26 is the anode of the reaction. Alternatively, during discharge, the negative electrolyte and negative electrode 26 may be respectively referred to as an anolyte and anode of the electrochemical reaction, while the positive electrolyte and the positive electrode 28 may be respectively referred to as a catholyte and cathode of the electrochemical reaction. During charge, the negative electrolyte and negative electrode 26 may be respectively referred to as the catholyte and cathode of the electrochemical reaction, while the positive electrolyte and the positive electrode 28 may be respectively referred to as the anolyte and anode of the electrochemical reaction. For simplicity, the terms "positive" and "negative" are used herein to refer to the electrodes, electrolytes, and electrode compartments in redox battery flow systems.

One example of a hybrid redox flow battery is an all iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous ion, $Fe^{2+}$, receives two electrons and plates as iron metal onto the negative electrode 26 during battery charge, and iron metal, $Fe^0$, loses two electrons and re-dissolves as $Fe^{2+}$ during battery discharge. At the positive electrode 28, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

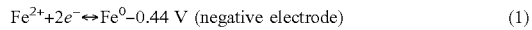

$Fe^{2+}+2e^-\leftrightarrow Fe^0 -0.44$ V (negative electrode) (1)

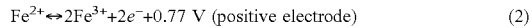

$Fe^{2+}\leftrightarrow 2Fe^{3+}+2e^- +0.77$ V (positive electrode) (2)

As discussed above, the negative electrolyte used in the IFB may provide a sufficient amount of $Fe^{2+}$ so that, during charge, $Fe^{2+}$ can accept two electrons from the negative electrode 26 to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is $-0.44$ V and thus, this reaction provides a negative terminal for the desired system. On the positive side of the IFB, the electrolyte may provide $Fe^{2+}$ during charge which loses an electron and oxidizes to $Fe^{3+}$. During discharge, $Fe^{3+}$ provided by the electrolyte becomes $Fe^{2+}$ by absorbing an electron provided by the positive electrode 28. The equilibrium potential of this reaction is $+0.77$ V, creating a positive terminal for the desired system.

The IFB provides the ability to charge and recharge its electrolytes in contrast to other battery types utilizing non-regenerating electrolytes. Charge is achieved by applying a current across the electrodes 26 and 28 via terminals 40 and 42, respectively. The negative electrode 26 may be electrically coupled via terminal 40 to the negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of the redox flow battery cell 18 to provide additional $Fe^{3+}$ ions via an external source, such as an external positive electrolyte chamber 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of the redox flow battery cell 18.

In an IFB, the positive electrolyte includes ferrous ions, ferric ions, ferric complexes, or any combination thereof, while the negative electrolyte includes ferrous ions or ferrous complexes, depending on the SOC of the IFB system. As previously mentioned, utilization of iron ions in both the negative electrolyte and the positive electrolyte allows for utilization of the same electrolytic species on both sides of the redox flow battery cell 18, which can reduce electrolyte cross-contamination and can increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, microporous membrane, and the like). For example, ferric ions in the positive electrolyte may be driven toward the negative electrolyte by a ferric ion concentration gradient and an electrophoretic force across the separator 24. Subsequently, ferric ions penetrating the separator 24 (e.g., the membrane barrier) and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micropores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion crossover may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal of the negative electrode 26 to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly connected to an integrated multi-chambered electrolyte storage tank 110. The redox flow battery cell 18 may generally include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or current in the redox flow battery system 10.

Further illustrated in FIG. 1 are the negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates 36 and 38 may be arranged proximate but spaced away from the electrodes 26 and 28 within the respective electrode compartments 20 and 22. In either case, the bipolar plates 36 and 38 may be electrically coupled to the terminals 40 and 42, respectively, either via direct contact therewith or through the negative and positive electrodes 26 and 28, respectively. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the redox flow battery cell 18. Reacted electrochemical species may also be directed away from the reaction sites by the combination of forced convection and the presence of the first and second bipolar plates 36 and 38.

As illustrated in FIG. 1, the redox flow battery cell 18 may further include negative battery terminal 40 and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes 26 and 28. In other words, the positive electrolyte is reduced (gains one or more electrons) at the positive electrode 28, and the negative electrolyte is oxidized (loses one or more electrons) at the negative electrode 26. The electrical potential difference across the battery is maintained by the electrochemical redox reactions in the positive electrode compartment 22 and the negative electrode compartment 20, and may induce a current through a current collector while the reactions are sustained. The amount of energy stored by a redox battery is limited by the amount of electroactive material available in electrolytes for discharge, depending on the total volume of electrolytes and the solubility of the electroactive materials.

The redox flow battery system 10 may further include the integrated multi-chambered electrolyte storage tank 110. The multi-chambered electrolyte storage tank 110 may be divided by a bulkhead 98. The bulkhead 98 may create multiple chambers within the multi-chambered electrolyte storage tank 110 so that both the positive and negative electrolytes may be included within a single tank. The negative electrolyte chamber 50 holds negative electrolyte including electroactive materials, and the positive electrolyte chamber 52 holds positive electrolyte including electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set the volume ratio of the negative and positive electrolyte chambers 50 and 52 according to the stoichiometric ratio between the negative and positive redox reactions. FIG. 1 further illustrates fill height 112 of the multi-chambered electrolyte storage tank 110, which may indicate the liquid level in each tank compartment. FIG. 1 also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered electrolyte storage tank 110 with returning electrolyte from the redox flow battery cell 18. The hydrogen gas may be separated spontaneously at the gas-liquid interface (e.g., fill height 112) within the multi-chambered electrolyte storage tank 110, thereby precluding having additional gas-liquid separators as part of the redox flow battery system 10. Once separated from the electrolyte, the hydrogen gas may fill the gas head spaces 90 and 92. As such, the stored hydrogen gas can aid in purging other gases from the multi-chambered electrolyte storage tank 110, thereby acting as an inert gas blanket for reducing oxidation of electrolyte species, which can help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying the system design, reducing the physical footprint of the redox flow battery system 10, and reducing system costs.

In one example, the gas head spaces 90, 92 of the integrated multi-chambered electrolyte storage tank 110 may be coupled to a gas storage tank 102, siphoning accumulated hydrogen to the gas storage tank 102. During periods when the redox flow battery system 10 is switched to an idle mode, the positive and negative electrode compartments 22, 20 may be intermittently drained. For example, valves (not shown at FIG. 1) controlling flow of electrolyte between the electrode compartments 20, 22 and the integrated multi-chambered electrolyte storage tank 110 may be opened and the electrolyte in the electrode compartments 20, 22 may be pumped out of the electrode compartments 20, 22. The electrode compartments 20, 22 may then be flushed under an oxygen-free environment by purging the empty electrode compartments 20, 22 with a gas such as the hydrogen delivered from the gas head spaces 90, 92 of the integrated multi-chambered electrolyte storage tank 110 via the gas storage tank 102. In some examples, the gas storage tank 102 may not be coupled to the integrated multi-chambered electrolyte storage tank 110. Instead, the gas storage tank 102 may be an independent tank of hydrogen gas or argon gas. Either hydrogen or argon gas may be used to flush the electrode compartments 20, 22 to reduce a likelihood of performance and/or capacitance loss while the redox flow battery system 10 is in the idle mode. Details of methods for the redox flow battery system 10 during the idle mode are described further below with reference to FIGS. 3-5.

FIG. 1 also shows spillover hole 96, which creates an opening in the bulkhead 98 between gas head spaces 90 and 92, and provides a means of equalizing gas pressure between the two chambers 50, 52. The spillover hole 96 may be positioned a threshold height above the fill height 112. The spillover hole 96 further enables a capability to self-balance the electrolytes in each of the positive and negative electrolyte chambers 50 and 52 in the event of a battery crossover. In the case of an all-iron redox flow battery system, the same electrolyte ($Fe^2$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered electrolyte storage tank 110 to maintain a continuously pressurized state without leaks. The multi-chambered electrolyte storage tank 110 can include at least one outlet from each of the negative and positive electrolyte chambers 50 and 52, and at least one inlet to each of the negative and positive electrolyte chambers 50 and 52. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers 50 and 52 may include one or more heaters. In the case where only the positive electrolyte chamber 52 includes one or more heaters, the negative electrolyte may be heated by transferring heat generated at the redox flow battery cell(s) 18 of a power module (e.g., power module 210, as discussed in detail below with reference to FIG. 2) to the negative electrolyte. In this way, the redox flow battery cell(s) 18 of the power module may heat and facilitate temperature regulation of the negative electrolyte. The one or more heaters may be actuated by controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples, the one or more heaters may include coil type heaters or other immersion heaters immersed in the electrolyte fluid, or surface mantle type heaters that transfer heat conductively through the walls of the negative and positive electrolyte chambers 50 and 52 to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solids fill threshold level. Said in another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers 52, 50 can be averted, thereby reducing a risk of overheating or burning out the heater(s).

Further still, one or more inlet connections may be provided to each of the negative and positive electrolyte chambers 50, 52 from a field hydration system (not shown). In this way, the field hydration system can facilitate commissioning of the redox flow battery system 10, including installing, filling, and hydrating the redox flow battery system 10, at an end-use location. Furthermore, prior to its commissioning at the end-use location, the redox flow battery system 10 may be dry-assembled at a battery manufacturing facility different from the end-use location without filling and hydrating the redox flow battery system 10, before delivering the redox flow battery system 10 to the end-use location. In one example, the end-use location may correspond to the location where the redox flow battery system 10 is to be installed and utilized for on-site energy storage. Said in another way, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated, and commissioned. Prior to hydration the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered electrolyte storage tank 110 are pumped via negative and positive electrolyte pumps 30 and 32 throughout the redox flow battery system 10. Electrolyte stored in negative electrolyte chamber 50 is pumped via negative electrolyte pump 30 through the negative electrode compartment 20 side of the redox flow battery cell 18, and electrolyte stored in positive electrolyte chamber 52 is pumped via positive electrolyte pump 32 through the positive electrode compartment 22 side of the redox flow battery cell 18.

Two electrolyte rebalancing reactors 80 and 82, may be connected in-line or in parallel with the recirculating flow paths of the electrolyte at the negative and positive sides of the redox flow battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the negative and positive electrode compartments 20 and 22 to the negative and positive electrolyte chambers 50 and 52, respectively. Electrolyte rebalancing reactors 80 and 82 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of the redox flow battery system 10, sensors and probes may monitor and control chemical properties of the electrolyte such as electrolyte pH, concentration, SOC, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72, 70 may be pH probes, optical probes, pressure sensors, voltage sensors, etc. Sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank is supplied via an external pump (not shown at FIG. 1) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the redox flow battery cell 18, or to perform other control functions, as an example. In this manner, the controller 88 may be responsive to, one or a combination of sensors and probes.

Redox flow battery system 10 may further include a source of hydrogen gas. In one example the source of hydrogen gas may include a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 or the gas storage tank 102 in order to rebalance the SOC of the electroactive species in the positive electrolyte and negative electrolyte. As an example, controller 88 may supply hydrogen gas from integrated multi-chambered electrolyte storage tank 110 or the gas storage tank 102 in response to a measured change in pH or in response to a measured change in SOC of an electrolyte or an electroactive species.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment 22) as $Fe(OH)_3$.

Other control schemes for controlling the supply rate of hydrogen gas from integrated multi-chambered electrolyte storage tank 110 responsive to a change in an electrolyte pH or to a change in an electrolyte SOC, detected by other sensors such as an oxygen-reduction potential (ORP) meter or an optical sensor, may be implemented. Further still, the change in pH or SOC triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small.

Figure 2:
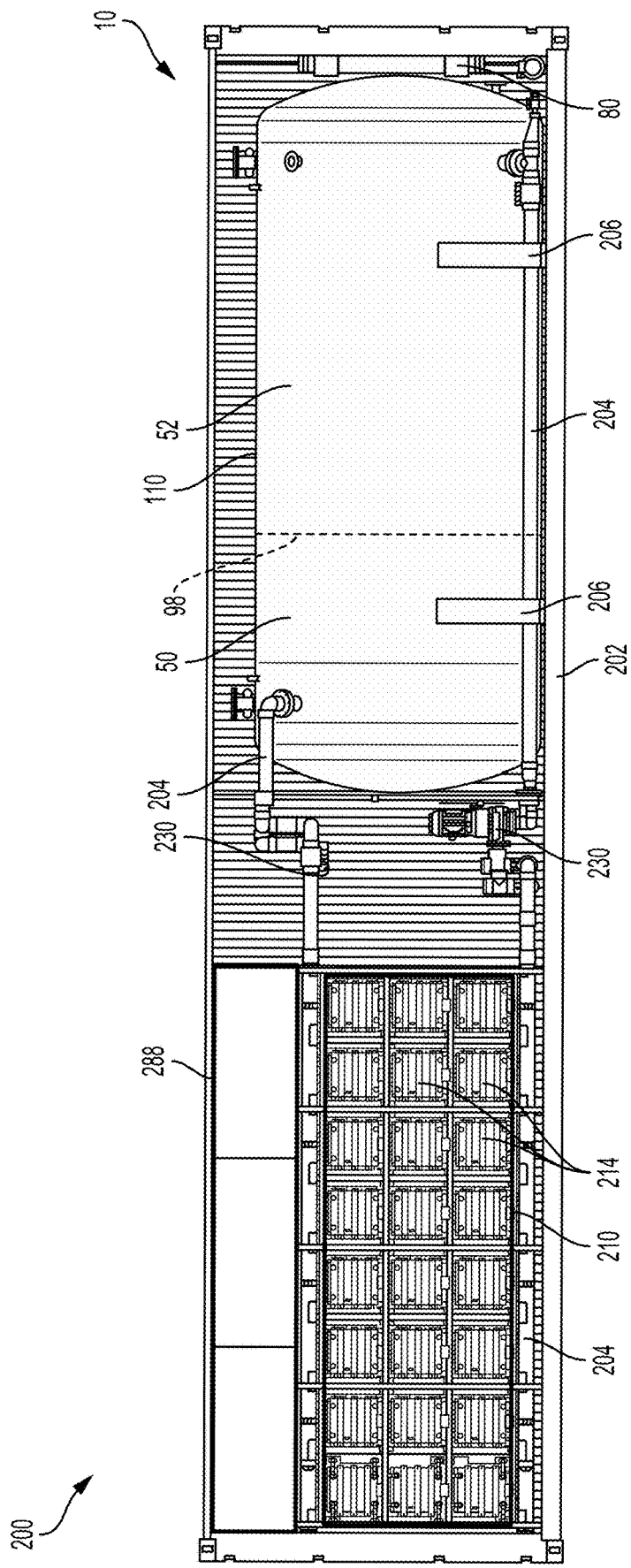
FIG. 2 shows a side view of an example layout for the redox flow battery system of FIG. 1.

Turning now to FIG. 2, it illustrates a side view of an example redox flow battery system layout 200 for the redox flow battery system 10. Redox flow battery system layout 200 may be housed within a housing 202 that facilitates long-distance transport and delivery of the redox flow battery system 10. In some examples, the housing 202 can include a standard steel freight container or a freight trailer that can be transported via rail, truck or ship. The redox flow battery system layout 200 can include the integrated multi-chambered electrolyte storage tank 110 and one or more rebalancing reactors (e.g., rebalancing reactor 80) positioned at a first side of the housing 202, and a power module 210, and power control system (PCS) 288 at a second side of the housing 202. Auxiliary components such as supports 206, as well as various piping 204, pumps 230, valves (not shown in FIG. 2), and the like may be included within the housing 202 (as further described above with reference to FIG. 1) for stabilizing and fluidly connecting the various components positioned therein. For example, one or more pumps 230 may be utilized to convey electrolyte from the integrated multi-chambered electrolyte storage tank 110 to one or more redox flow battery cell stacks 214 within the power module 210. Furthermore, additional pumps 230 may be utilized to return electrolyte from the power module 210 to the negative electrolyte chamber 50 or the positive electrolyte chamber 52 of the integrated multi-chambered electrolyte storage tank 110.

Power module 210 may include one or more redox flow battery cell stacks 214 electrically connected in parallel and/or in series. Each of the one or more redox flow battery cell stacks 214 may further include a plurality of redox flow battery cells 18 connected in parallel and/or series. In this way, power module 210 may be able to supply a range of current and/or voltages to external loads. The PCS 288 includes controller 88 of FIG. 1, as well as other electronics, for controlling and monitoring operation of the redox flow battery system 10. Furthermore, PCS 288 may regulate and monitor voltage supplied to external loads, as well as supplying current and/or voltage from external sources for charging of the power module 210. The PCS 288 may further regulate and control operation of the redox flow battery system 10 during an idle state or idle mode. The redox flow battery system 10 being in an idle state may include when the power module 210 is not in charge mode or discharge mode. As an example, the power module 210 may be in charge mode when an external voltage or current is supplied to one or more redox flow battery cells 18 of the power module 210 resulting in reduction of electrolyte and plating of the reduced electrolyte at the negative electrode(s) of the one or more redox flow battery cells 18. For the case of an IFB, ferrous ions may be reduced at the plating electrode(s) of one or more redox flow battery cells 18, thereby plating iron thereat during charging of the power module 210. As another example, the power module 210 may be in a discharge mode when voltage or current is supplied from one or more redox flow battery cells 18 of the power module 210 resulting in oxidation of plated metal at the negative electrode resulting in deplating (e.g., loss of metal) and solubilizing of the oxidized metal ions. For the case of an IFB, iron may be oxidized at the plating electrode of one or more redox flow battery cells 18, thereby solubilizing ferrous ions thereat during discharging of the power module 210. Further details regarding conditions for entering and exiting the battery charge and discharge modes of the redox flow battery system 10 are described with reference to FIGS. 3-5 below.

Turning now to FIGS. 3-5, they show flow charts for method 300, 400, and 500, respectively, for operating a redox flow battery system, such as the redox flow battery system 10 of FIGS. 1 and 2. Instructions for carrying out methods 300, 400, and 500 may reside onboard and be executed by a controller, such as controller 88 of FIG. 1. For example, the executable instructions may be stored in non-transitory memory onboard the controller and may be executed in conjunction with signals received from sensors of redox flow battery system, such as the sensors described above with reference to FIG. 1. The controller may further employ actuators including pumps, valves, heaters, and the like, as described above with reference to FIG. 1, of the redox flow battery system to adjust battery operation, according to the methods described below.

Method 300 includes a method for determining when the redox flow battery system may be in a charging, discharging, or idle mode. The method 300 may begin at 302, where the method includes determining, estimating, and/or measuring current battery operating parameters. Current battery operating parameters may include, but are not limited to, one or more of battery SOC, power (including current and voltage) supplied to the power module, power (including current and voltage) supplied by the power module, internal power demand set points, and external power demand set points, and the like.

At 304, the method 300 includes determining if a power set point of the redox flow battery system is greater than zero, e.g., a positive value. The power set point may be an amount of power measured at a power module, e.g., the power module 210 of FIG. 2, of the redox flow battery system. The power set point may be greater than zero when battery cells of the power module are receiving a current or voltage from an external source. If the power set point is detected to be greater than zero, the redox flow battery system is determined to be in a charging mode at 306 and the method 300 returns.

In one example, the redox flow battery system may be in the charging mode when a system DC voltage is lower than a microgrid DC bus voltage. In response, the redox flow battery system may be configured to automatically adjust to the charging mode to maintain the bus voltage.

If the power set point is not greater than zero, the method 300 continues to 308 to evaluate if the power set point is less than zero, e.g., a negative value. The power set point may be less than zero when battery cells of the power module are supplying a current or voltage to an external source. If the power set point is detected to be less than zero, the redox flow battery system is determined to be in a discharging mode at 310 and the method 300 returns.

In one example, the redox flow battery system may be in the discharging mode when the system DC voltage is higher than the microgrid DC bus voltage. The redox flow battery system may be configured to automatically adjust to the discharging mode to maintain the bus voltage.

If the power set point is not less than zero, the power set point is deemed to be equal to zero. The method 300 proceeds to 312 to adjust the redox flow battery system to an idle mode. A method 400 for the idle mode of the redox flow battery system is shown in FIG. 4.

Turning now to FIG. 4, it shows the method 400 for idling a redox flow battery system that can aid in lowering system capacity losses. Method 400 includes adjusting a pump ON/OFF status based on a time elapsed between pump activation cycles during idle mode of the redox flow battery system. Method 400 may begin following 312 of method 300 of FIG. 3, when the redox flow battery system enters idle mode.

The method 400 may begin at 402, where the controller 88 may estimate and/or measure operating parameters of the redox flow battery system. As described above at 302 of FIG. 3, the controller 88 may determine one or more of battery SOC, power module voltage, pump activity (e.g., electrolyte pump ON/OFF statuses, electrolyte pump flow rates, pump timers, and the like), electrolyte temperatures, power (including current and voltage) supplied to the power module, power (including current and voltage) supplied by the power module, internal power demand set points, and external power demand set points, and the like. Various operating parameters may be indicated by one or more sensors of the redox flow battery system.

At 404, in response to the redox flow battery system being in idle mode, the method 400 includes deactivating power electronics. Power electronics may include one or more of a DC/DC converter, DC/AC inverter, and a power module contactor. Deactivating power electronics may aid in reducing power consumption of the redox flow battery system while in idle mode. Deactivating the power electronics may include a controller signaling to one or more actuators of the redox flow battery system to power OFF, which may inhibit an ability of the redox flow battery system to discharge and/or charge. Deactivating the power electronics may include a mechanical switch that a user may set in idle mode. Additionally, deactivating power electronics may include display of a message at a human machine interface (HMI) to alert a user that the redox flow battery system is in (or initiating) the idle mode. Furthermore, the display of the HMI may be dimmed or put in sleep mode, thereby reducing an illumination emitted therefrom.

Next, at 406, in response to the redox flow battery system being in idle mode, the controller 88 may reduce the electrolyte temperature in order to further reduce power consumption while operating in idle mode. Reducing electrolyte temperature also may aid in reducing overall heat losses to the environment during idle mode due to lower temperature gradients between the redox flow battery system and the surrounding ambient atmosphere. In one example, reducing the electrolyte temperature may include adjusting a heater set point based on the redox flow battery system being in idle mode. For example, the controller 88 may send a control signal to one or more heater actuators to reduce an electrolyte temperature below an idle threshold temperature. The one or more heaters may be thermally coupled to the negative and positive electrode compartments 20 and 22, and/or the negative and positive electrolyte chambers 50 and 52 of the multi-chambered electrolyte storage tank 110 (see FIG. 1). Adjusting a heater set point may further include reducing a heater output power set point to reduce heater output power in order to reduce the electrolyte temperature below the idle threshold temperature. The idle threshold temperature may be based on a solubility or stability of the electrolytes during idle mode. For example, below the idle threshold temperature, a risk of destabilization of the electrolyte may be increased; destabilization of the electrolyte may include precipitation of electrolyte salts, which reduces the redox flow battery system capacity and performance. Such destabilization may be considered less problematic during idle mode than during battery charge and discharge modes, though switching from idle mode to battery charge or discharge mode may take longer (e.g., while the electrolyte re-stabilizes). In contrast, above the idle threshold temperature, a risk of destabilization of the electrolyte is reduced and electrolyte stability can be maintained without precipitation of any electrolyte salts. The relationship between electrolyte solubility, the idle threshold temperature, and the control signal (e.g., heater output power) for the one or more heaters may be predetermined or otherwise empirically determined for a particular redox flow battery system.

In another example, reducing the electrolyte temperature may include the controller 88 adjusting a control signal to one or more heaters to decrease a heater set point in order to decrease the electrolyte temperature during idle mode relative to an electrolyte temperature during battery charge and discharge modes. In one example, lowering a heater output power during idle mode may cool or lower an amount of heat transferred from the one or more heaters to the electrolyte relative to the amount of heat transferred from the one or more heaters to the electrolyte during battery charge and discharge modes. A temperature of a redox flow battery system during battery charge and discharge modes may be substantially equal to 60° C., in one example. However, during idle mode, the heater setting may be decreased to maintain redox flow battery system to an idle threshold temperature equivalent to an ambient or room temperature range between 25-30° C.

At 408, in response to the redox flow battery system being in the idle mode, the controller 88 begins cycling of the electrolyte pump(s), including deactivating the electrolyte pump and initiating a first timer, timer 1, and a second timer, timer 2. The first timer may be used to indicate an elapsed time since one or more electrolyte pumps have been deactivated. Deactivating the electrolyte pump may include turning off the electrolyte pump, wherein the pump may remain dormant while the redox flow battery system may be maintained in a state (e.g., SOC greater than a threshold SOC) where the redox flow battery system can readily provide a desired power output promptly upon receiving a power request. In one example, deactivating the one or more electrolyte pumps may include deactivating pumps 30 and/or 32 of FIG. 1. In other examples, deactivating the one or more electrolyte pumps may include deactivating a sufficient number of pumps such that circulation of electrolyte to and from the redox flow battery cells is stopped. In further examples, deactivating the one or more electrolyte pumps may include deactivating a sufficient number of pumps such that circulation of electrolyte to and from the redox flow battery cells is reduced below a deactivation threshold flow rate.

In this way, an electrolyte flow rate and pumping of electrolytes from the multi-chambered electrolyte storage tank 110 to the negative and positive electrolyte chambers 50 and 52 of one or more redox flow battery cells 18 may be stopped or maintained at the deactivation threshold flow rate. In one example, the deactivation threshold flow rate may correspond to a flow rate below which shunting losses are substantially reduced since the supply of fresh electrolyte to the redox flow battery cells is reduced. In another example, the deactivation threshold flow rate may correspond to a zero flow rate, and shutting off the electrolyte pump. In some cases, having a non-zero deactivation flow rate may help to preserve a life of the electrolyte pump, by avoiding completely shutting the pump off. Stopping the electrolyte flow and/or reducing the flow of electrolyte to the deactivation threshold flow rate during idle mode can aid in reducing shunt losses conducted through the flowing electrolytes since the amount of fresh electrolyte supplied to the redox flow battery cells is reduced. Furthermore, shunt current losses may be confined to the existing volume of electrolyte within the power module when the pumps are deactivated, including operating below the deactivation threshold flow rate. Having a lower concentration of fresh electrolyte in the redox flow battery cells during idle mode can reduce a driving force for current shunt losses through the electrolyte. Furthermore, cycling the electrolyte pumps, including deactivating the electrolyte pumps at 408, can aid in reducing parasitic pump power losses.

At 409, the controller 88 may include measuring the first timer, and determining a duration for which one or more of the electrolyte pumps was deactivated. At 410, the controller 88 may determine if the first timer is greater than a first threshold duration. The first threshold duration may be based on a target amount of time between successive activation (cycling ON) of the electrolyte pump during idle mode. As described above, deactivating the electrolyte pump may include turning off the electrolyte pump, wherein the pump may remain dormant while the redox flow battery system may be maintained in a state (e.g., SOC greater than a threshold SOC) where the redox flow battery system can readily provide a desired power output promptly upon receiving a power request. In other words, the first threshold duration may correspond to a pump OFF interval during idle mode. In one example, the first threshold duration may be a fixed interval relative to a pump ON interval corresponding to a second threshold duration. In one case, the pump OFF interval may be set relative to the pump ON interval such that an overall pump OFF duration during idle mode is 5/6 of an overall duration of idle mode; in other words, a ratio of the pump OFF interval to the pump ON interval would be 5 to 1 and a ratio of the first threshold duration to the second threshold duration would be 5 to 1. For example, the first threshold duration may be equal to 50 minutes and the second threshold duration may be equal to 10 minutes; thus, during idle mode, the pump would remain OFF 50 minutes for every hour of idle time.

Alternatively, the first threshold duration may be adjusted based on a power module voltage measured prior to the initiation of the idle mode. In one example, the first threshold duration may be higher corresponding to the power module voltage just prior to entering idle mode being higher, and the first threshold duration may be lower for the case where the power module voltage just prior to entering idle mode is lower. In this way, the first threshold duration may allow for longer cycling periods from a higher initial voltage prior to entering idle mode, and may allow for shorter cycling periods from a lower initial voltage prior to entering idle mode. For the case where the first timer is less than the first threshold duration, the method 400 proceeds from 410 to 412 to continue to monitor the first timer and maintain the electrolyte pump deactivated.

If the first timer is greater than or equal to the first threshold duration, then the method 400 proceeds from 410 to 414 to send a control signal to the actuator of the electrolyte pump to activate the electrolyte pump at an idle threshold flow rate. The idle threshold flow rate may correspond to an electrolyte flow rate below which idling electrolyte within the power module is not refreshed enough so that a responsiveness of the redox flow battery system for supplying power on demand to an external load is reduced below a desirable level. In other words, if the electrolyte flow rate is below the idle threshold flow rate, the supply of electrolyte to the redox flow battery cells may not be sufficient to promptly respond to a command from the controller 88 for supplying power to an external load. As such there may be an undesirable extended delay, allowing for enough fresh electrolyte to reach the redox flow battery cells, before enough current/power can be supplied to meet the commanded demand. Said in another way, if the pump is not reactivated after the first threshold duration, a responsiveness of the redox flow battery system to promptly supply power to a commanded external load may be reduced. In one example, the idle threshold flow rate may be less than a charge or discharge threshold flow rate of the redox flow battery system (e.g., threshold flow rates during the battery charge and discharge modes, respectively). For example, the idle threshold flow rate may correspond to 10% of the charge or discharge threshold flow rate. Accordingly, in such examples, the idle threshold flow rate may be non-zero. Similar to examples wherein the deactivation threshold flow rate is non-zero, the idle threshold flow rate being non-zero may help to preserve the life of the electrolyte pump, by avoiding completely shutting the pump off. In an additional or alternative example, the idle threshold flow rate may be greater than or equal to the deactivation threshold flow rate. In some instances, the idle threshold flow rate to a negative electrolyte chamber may be different from the idle threshold flow rate to the positive electrolyte chamber. At any rate, it will be appreciated that the pump flow rate is reduced for idle mode compared to the pump flow rate during the battery charge and discharge modes. A third timer, timer 3, is initiated in conjunction with the activation of the electrolyte pump, the third timer measuring a pump ON duration during the idle pump cycling of method 400.

In some examples, at least a negative electrode compartment of the redox flow battery system is drained, resulting in partial to complete replacement of a volume of electrolyte stored in the negative electrode compartment. In other examples, both the negative electrode compartment and a positive electrode compartment are drained. The electrolyte drained from the electrode compartment(s) may be returned to a corresponding electrolyte storage tank or may be passed through an electrolyte treatment system before delivery to the electrolyte storage tank. The electrode compartment(s) may be concurrently refilled from the electrolyte storage tank during draining to maintain a steady state electrolyte volume in the electrode compartment(s) or the electrode compartment(s) may be first partially drained and then refilled immediately before or when the third timer reaches a second threshold duration.

In some examples, the refilling of the electrode compartment(s) may occur periodically at either the negative electrode compartment exclusively or both the negative and positive electrode compartments. For example, the electrode compartment(s) may be refilled for 5 minutes every hour to maintain the redox flow battery system at a relatively warm temperature.

At 416, following measurement of the third timer, the method 400 includes determining if the third timer is greater than the second threshold duration. The second threshold duration may be based on an amount of time desired to activate the pump during the idle mode to maintain a responsiveness of the redox flow battery system for meeting anticipated power demands from an external load, while also decreasing battery capacity losses experienced by the redox flow battery system and parasitic power losses due to operation of the pump and heating element. Capacity losses may include a mitigated power output of the redox flow battery system and may also include minimized ionic mixing at the membrane interface. In one example, the second threshold duration is 20% of the first threshold duration.

If the third timer is less than the second threshold duration, then the electrolyte has not been adequately refreshed to achieve the desired system responsiveness to an anticipated external load command, and the method 400 proceeds from 416 to 418 to continue monitoring the third timer. The electrolyte pump remains activated at the idling threshold flow rate while the third timer is less than the second threshold duration.

If the third timer is greater than or equal to the second threshold duration at 416, indicating that the electrolyte has been refreshed enough to allow for achieving a desired system responsiveness to an anticipated external load command, method 400 continues to 420 where it determines if idle mode conditions are continued to be met. Meeting idle mode conditions may include determining if the redox flow battery system is not in either a charging mode (e.g., the battery charge mode) or a discharging mode (e.g., the battery discharge mode). Thus, determining if idle mode conditions are still met may be performed as described for method 300. For the case where idle conditions are not met (e.g., the power set point is greater or less than zero and the redox flow battery system enters the charging or discharging mode), the method 400 returns to method 300 of FIG. 3. For the case where idle conditions are still met, and following measurement of the second timer, the method 400 continues to 422 to determine if the second timer is greater than a third threshold duration.

The third threshold duration may be a duration of time greater than the first threshold duration, beyond which a pH of the negative electrolyte may rise, leading to iron hydroxide ($Fe(OH)_3$) formation at the negative electrode. In some examples, the third threshold duration may be greater than the first threshold duration and the second threshold duration combined. Furthermore, the third threshold duration may be longer than the combined first and second threshold durations so that the first timer may reset and cycle through the first and second threshold durations one or more times before the third threshold duration elapses.

An increased presence of $Fe(OH)_3$ at the negative electrode compartment may degrade a performance of the redox flow battery system subsequent to the redox flow battery system exiting the idle mode. As such, the third threshold duration may be a period of time during which a likelihood of $Fe(OH)_3$ build-up to an extent that results in poor battery performance is increased. In one example, the third threshold duration may be a set period of time, such as three hours, five hours, or eight hours. In another example, the third threshold duration may be based on the first threshold duration. For example, the third threshold duration may be three times or five times the first threshold duration.

If the second timer does not reach or exceed the third threshold duration, method 400 returns to 408 to continue idle mode operation. In this way, during the idle mode, method 400 repeatedly cycles the electrolyte pump between the active state and the inactive state. As described above, each of the idle threshold temperature, deactivation threshold flow rate, idle threshold flow rate, first threshold duration, second threshold duration, and third threshold duration may be adjusted according to the anticipated power demands during an idle mode. For example, when the anticipated power demands during an idle mode are higher, an idle threshold temperature may be higher, a deactivation threshold flow rate may be higher, an idle threshold flow rate may be higher, a first threshold duration may be lower, and a second threshold duration may be higher in order to increase a responsiveness of the redox flow battery system. Conversely, when the anticipated power demands during an idle mode are lower, an idle threshold temperature may be lower, a deactivation threshold flow rate may be lower, an idle threshold flow rate may be lower, a first threshold duration may be higher, and a second threshold duration may be lower in order to decrease a responsiveness of the redox flow battery system while reducing parasitic power losses due to pumping and heating and reducing shunt losses through the electrolyte. In this way, idle mode operation parameters may be adjusted by the controller 88 depending on the anticipated power needs to maintain a redox flow battery system responsiveness while reducing parasitic and shunting losses.

If the second timer is equal to or greater than the third threshold duration, method 400 proceeds to method 500, as shown in FIG. 5. In some instances, the first timer may reach the first threshold duration concurrent with the second timer reaching the third threshold duration. In such instances, method 500 may be prioritized over method 400 [e.g., method 400 may proceed to method 500 at 410, rather than at 422, and draining, purging, and refilling of the electrode compartment(s) may be prioritized over activation of the electrolyte pump]. At 502, method 500 includes draining one or more electrode compartments of the redox flow battery system. In some examples, only the negative electrode compartment may be drained and the positive electrode compartment may be left filled. For example, the negative and positive electrolytes in the electrode compartments may be pumped out of the electrode compartments to an electrolyte storage tank of the redox flow battery system, such as the integrated multi-chambered electrolyte storage tank 110 shown in FIG. 1. Alternatively, the electrolyte may be treated at an electrolyte treatment system, such as one or more rebalancing reactors, for restoring electrolyte charge balance and pH, before returning the electrolyte to the electrolyte storage tank.

The emptied electrode compartment(s) may be flushed with a gas under an oxygen-free environment. As an example, the gas may be hydrogen or argon and delivered from a gas storage tank, such as the gas storage tank 102 of FIG. 1. The electrode compartments may be purged with gas for a predetermined period of time. The predetermined period of time may be an amount of time calculated based on a volume of the electrode compartment(s) and a flow rate of gas to flush the electrode compartment(s) with a volume of gas equal to a minimum multiple of the volume of the electrode compartment(s). For example, the period of time may be set to flush the electrode compartments with a volume of gas at least once, double, triple, or five times the volume of the electrode compartment(s). Alternatively, a pressure tester may be used to determine if standing liquid hydraulic pressure is present.

The electrode compartment(s) are refilled with electrolyte at 506. Negative electrolyte may be pumped to the negative electrode compartment and positive electrolyte may be pumped to the positive electrode compartment from the electrolyte storage tank. Alternatively, electrolyte may be returned to the electrode compartment(s) from the electrolyte treatment system, e.g., the one or more rebalancing reactors.

Upon refilling the electrode compartments with electrolyte, method 500 includes determining if the idle mode conditions are still met at 508. Meeting idle mode conditions may include determining if the redox flow battery system is not in either a charging mode or a discharging mode. Thus, determining if idle mode conditions are still met may be performed as described for method 300. If idle conditions are not met (e.g., the redox flow battery system enters charging or discharging mode), method 500 returns to method 300 to determine current operating parameters of the redox flow battery system. If idle conditions are met, method 500 returns to 408 of method 400 to continue monitoring timers 1 and 2.

By monitoring the first and second timers and carrying out processes described in methods 300, 400, and 500, a loss of battery performance and capacitance during periods when the redox flow battery system is idling may be mitigated. In some examples, method 400 may be excluded and the method 300 may proceed only to method 500 when the battery enters the idle mode. Method 500, e.g., draining and purging the electrode compartment(s), may provide more effective maintenance of battery performance than method 400, e.g., electrolyte pumping at higher frequency, alone. As an example, method 400 may, in some instances, lead to shunting loss in larger battery modules when the redox flow battery system is in the idle mode for long periods, such as several hours or days. Shunting losses, however, may be mitigated by draining and purging the electrode compartment(s). By draining and purging the electrode compartment(s), followed by refilling with fresh electrolyte, the battery capacitance may be restored, thereby minimizing losses due to shunting.

Turning now to FIG. 6, it shows a time plot 600 graphically illustrating redox flow battery conditions during and outside of an idle mode with time measured along a horizontal axis, where time increases from a left to right side of the time plot 600. The time plot 600 illustrates the methods 300, 400, and 500 executed in parallel by the battery system of FIGS. 1 and 2. In this way, each of the methods 300, 400, and 500 may occur simultaneous to one another. Plot 602 illustrates an electrolyte pump status, plot 604 illustrates if a redox flow battery idle condition is being met, plot 606 illustrates a position of a drain valve of one or more electrode compartments, and plot 608 illustrates passive gas flow (e.g., hydrogen or argon) into the one or more electrode compartments, as measured by, for example, a mass flow controller in a gas line coupling a gas cylinder or a head space of an electrolyte storage tank to the one or more electrode compartments. The passive gas flow at plot 608 may be driven by a pressure gradient, e.g., a difference in pressure between a gas storage tank and the one or more electrode compartments.

Prior to t1, the electrolyte pump is on (plot 602) and battery idle conditions are not met as shown by plot 604. The drain valve, controlling flow of electrolyte out of the one or more electrode compartments and to an electrolyte treatment system, is closed (plot 606) and gas is not flowing to the one or more electrode compartments (plot 608). As such, the battery may be in a charge or discharge mode.

At t1, redox flow battery idle conditions are met and the redox flow battery transitions from the charge or discharge mode to the idle mode. The electrolyte pump is turned off in response to the transition to the idle mode. The drain valve is maintained closed and the gas is not flowing. One or more timers, e.g., the first and second timers described in method 400 of FIG. 4 may also be initiated in response to adjustment of the redox flow battery to the idle mode.

The first timer reaches a first threshold duration at t2. In response to the first threshold duration elapsing, the electrolyte pump is actuated on. A third timer may be activated. Electrolyte is thereby delivered to the one or more electrode compartments.

At t3, the third timer reaches a second threshold duration. The electrolyte pump is deactivated and the drain valve is opened to allow at least a portion of the electrolyte in the one or more electrode compartments to flow out. Pressure in the one or more electrode compartments decreases, forming a vacuum, as electrolyte is drained out, compelling gas to flow into the one or more electrode compartments to alleviate the pressure gradient. When a desired amount of electrolyte is drained from the one or more electrode compartments, determined based on an amount of time elapsed or a hydraulic pressure measurement from a pressure tester, the drain valve is closed. Closing the drain valve also halts gas flow into the one or more electrode compartments.

A fourth threshold duration is reached at t4. At t4, the electrolyte pump is activated to refill the one or more electrode compartments with fresh electrolyte. Accordingly, in one example, the electrolyte is drained from the one or more electrode compartments, the one or more electrode compartments is purged with gas, and the one or more electrode compartments is refilled with the fresh electrolyte in sequence. Refilling of the electrode compartments continues until a target volume of electrolyte in the one or more electrode compartments is attained at t5. The pump is deactivated at t5 and the redox flow battery remains in the idle mode.

At t6, redox flow battery idle conditions are no longer met. As such, the electrolyte pump is reactivated with the drain valve closed. In this way, the redox flow battery is in the charge or discharge mode and has exited the idle mode.

Graph 700 is shown in FIG. 7, plotting percent battery SOC, along the x-axis, against time in seconds, along the y-axis. Three idle mode treatments are depicted in graph 700, including plot 702 illustrating electrolyte pumping cycling for 30 minutes with a 30-minute drain, plot 704 illustrating electrolyte pumping cycling for 45 minutes with a 15-minute drain, and plot 706 illustrating complete drainage of electrolyte in the electrode compartments. The 30-minute and 15-minute drainages of the electrode compartments resulted in only partial removal and replacement of electrolyte while complete drainage demanded a prolonged period of time, as indicated at arrow 708.

Both plots 702 and 704 show a gradual decrease in battery SOC over time, including multiple pumping and partial drainage cycles. A single full drainage cycle is shown by plot 706. Upon refilling the electrode compartments at arrow 708, the SOC may return to a percentage similar to an initial SOC of the battery. In one example, as shown in FIG. 7, the battery SOC may initially be 48% and may return to 47.8% after complete drainage. In contrast, both plots 702 and 704 show reduced battery SOC at a time period indicated by arrow 708.

In this way, battery performance may be maintained even when a redox flow battery is operated in an idle mode for an extended period of time. Upon fully draining at least a negative electrode compartment of the redox flow battery upon passage of a threshold period of time, adverse effects of idle mode operation, such as formation of $Fe(OH)_3$ and rise in electrolyte pH, may be mitigated. The complete drainage of the electrode compartment(s) may be combined with periodic, shorter term electrolyte pumping. The electrolyte pumping may be accompanied by at least partial drainage of electrolyte from the electrode compartment(s). By fully replacing the electrolyte in the electrode compartment(s), a performance of the redox flow battery may be maintained for a longer period of time, thereby prolonging a useful life of the battery.

The disclosure also provides support for a method of operating a redox flow battery system, the method comprising: responsive to switching the redox flow battery system to an idle mode, wherein the idle mode includes operation of the redox flow battery system outside of a charging mode and outside of a discharging mode, completely draining electrolytes from one or more electrode compartments of the redox flow battery system, purging the one or more electrode compartments with a gas, and refilling the one or more electrode compartments with fresh electrolytes. In a first example of the method, the method further includes wherein the electrolytes are completely drained from the one or more electrode compartments responsive to a first threshold period of time elapsing, and wherein the method further comprises, in response to a second threshold period of time elapsing while the redox flow battery system is in the idle mode, the second threshold period of time being shorter than the first threshold period of time, activating an electrolyte pump to circulate the electrolytes through the one or more electrode compartments. In a second example of the method, optionally including the first example of the method, the method further comprises deactivating the electrolyte pump following activation of the electrolyte pump (e.g., when a third threshold period of time elapses, the third threshold period of time initiated upon activation of the electrolyte pump). In a third example of the method, optionally including one or more of the first and second examples of the method, the method further includes wherein purging the one or more electrode compartments with the gas comprises flushing the one or more electrode compartments with an inert gas. In a fourth example of the method, optionally including the first through third examples, purging the one or more electrode compartments with the gas comprises flushing the empty one or more electrode compartments for a pre-set period of time. In a fifth example of the method, optionally including one or more of the first through fourth examples of the method, the method further includes wherein purging the one or more electrode compartments with the gas comprises flowing the gas to the one or more electrode compartments during draining of the one or more electrode compartments until a pressure measured in the one or more electrode compartments indicates that the one or more electrode compartments are empty. In a sixth example of the method, optionally including one or more of the first through fifth examples of the method, the method further includes wherein completely draining the electrolytes from the one or more electrode compartments, purging the one or more electrode compartments, and refilling the one or more electrode compartments comprises draining, purging, and refilling a negative electrode compartment. In a seventh example of the method, optionally including one or more of the first through sixth examples of the method, the method further includes wherein completely draining the electrolytes from the one or more electrode compartments, purging the one or more electrode compartments, and refilling the one or more electrode compartments comprises draining, purging, and refilling each of a negative electrode compartment and a positive electrode compartment. In an eighth example of the method, optionally including one or more of the first through seventh examples of the method, the method further includes wherein refilling the one or more electrode compartments with the fresh electrolytes comprises replenishing the one or more electrode compartments with electrolytes having a lower pH and a lower iron hydroxide content than the electrolytes drained from the one or more electrode compartments. In a ninth example of the method, optionally including one or more of the first through eighth examples of the method, the method further includes wherein completely draining the electrolytes from the one or more electrode compartments, purging the one or more electrode compartments with the gas, and refilling the one or more electrode compartments with the fresh electrolytes are performed in sequence, and wherein refilling the one or more electrode compartments with the fresh electrolytes occurs periodically.

The disclosure also provides support for a method of operating a redox flow battery system, the method comprising: switching the redox flow battery system to an idle mode, wherein the idle mode includes operation of the redox flow battery system outside of a charging mode and outside of a discharging mode, responsive to a first threshold period of time elapsing while the redox flow battery system is in the idle mode, activating an electrolyte pump to circulate electrolyte through at least one electrode compartment of the redox flow battery system (e.g., for a pre-set duration), and responsive to a second threshold period of time elapsing while the redox flow battery system is in the idle mode, the second threshold period of time longer than the first threshold period of time, completely draining the at least one electrode compartment, purging the at least one electrode compartment with a gas, and periodically refilling the at least one electrode compartment with fresh electrolyte. In a first example of the method, the method further comprises initiating a first timer to monitor passage of time relative to the first threshold period of time and a second timer to monitor passage of time relative to the second threshold period of time, wherein the first timer and the second timer are simultaneously initiated by switching of the redox flow battery system to the idle mode. In a second example of the method, optionally including the first example of the method, the method further comprises upon activating the electrolyte pump, initiating a third timer to monitor passage of time relative to a third threshold period of time, and deactivating the electrolyte pump after passage of the third threshold period of time. In a third example of the method, optionally including one or more of the first and second examples of the method, the method further includes wherein elapsing of the first and third threshold periods of time occur before the second threshold period of time elapses, and wherein the first timer is reset when the third threshold period of time elapses. In a fourth example of the method, optionally including one or more of the first through third examples of the method, the method further includes wherein activating the electrolyte pump in response to the first threshold period of time elapsing occurs one or more times during the second threshold period of time. In a fifth example of the method, optionally including one or more of the first through fourth examples of the method, the method further comprises prioritizing draining, purging, and periodically refilling the at least one electrode compartment in response to the second threshold period of time elapsing over activating the electrolyte pump in response to the first threshold period of time elapsing when elapsing of the first and second threshold periods of time coincide. In a sixth example of the method, optionally including one or more of the first through fifth examples of the method, the method further includes wherein purging the at least one electrode compartment with the gas comprises flowing the gas through the at least one electrode compartment under oxygen-free conditions (e.g., for a duration of time) to flush the at least one electrode compartment with a target volume of the gas and wherein the at least one electrode compartment comprises a negative electrode compartment and a positive electrode compartment. In a seventh example of the method, optionally including one or more of the first through sixth examples of the method, the method further comprises halting the flow of the gas through the at least one electrode compartment and periodically refilling the at least one electrode compartment when the target volume of the gas is attained.

The disclosure also provides support for a redox flow battery system, comprising: a power module comprising a plurality of redox flow battery cell stacks, each of the plurality of redox flow battery cell stacks comprising a redox flow battery cell, an electrolyte pump capable of delivering electrolyte from an electrolyte tank to the power module, and a power control system with a controller storing executable instructions in non-transitory memory, the instructions executable to: switch the redox flow battery system to an idle mode, wherein the idle mode includes operation of the redox flow battery system outside of a charging mode and outside of a discharging mode, activate the electrolyte pump while the redox flow battery system is in the idle mode to circulate the electrolyte through one or more electrode compartments of the redox flow battery system (e.g., for a pre-set duration when a first threshold period of time elapses), completely drain the electrolyte from the one or more electrode compartments of the redox flow battery system while the redox flow battery system in in the idle mode (e.g., when a second threshold period of time elapses), purge the drained one or more electrode compartments with a gas, and periodically refill the drained and purged one or more electrode compartments with fresh electrolyte. In a first example of the redox flow battery system, the redox flow battery system further includes wherein completely draining the electrolyte from the one or more electrode compartments comprises opening a drain valve of each of the one or more electrode compartments (e.g., in response to the second threshold period of time elapsing). In a second example of the redox flow battery system, optionally including the first example of the redox flow battery system, the redox flow battery system further includes wherein the drain valve is closed when the one or more electrode compartments are flushed with a target volume of the gas, and wherein the gas is hydrogen or argon.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a redox flow battery system, the method comprising:
    responsive to switching the redox flow battery system to an idle mode, wherein the idle mode includes operation of the redox flow battery system outside of a charging mode and outside of a discharging mode,
        completely draining electrolytes from one or more electrode compartments of the redox flow battery system;
        purging the one or more electrode compartments with a gas; and
        refilling the one or more electrode compartments with fresh electrolytes, wherein the electrolytes are completely drained from the one or more electrode compartments responsive to a first threshold period of time elapsing, and
    wherein the method further comprises, in response to a second threshold period of time elapsing while the redox flow battery system is in the idle mode, the second threshold period of time shorter than the first threshold period of time, activating an electrolyte pump to circulate the electrolytes through the one or more electrode compartments.

2. The method of claim 1, further comprising deactivating the electrolyte pump following activation of the electrolyte pump.

3. The method of claim 1, wherein purging the one or more electrode compartments with the gas comprises flushing the one or more electrode compartments with an inert gas.

4. The method of claim 1, wherein purging the one or more electrode compartments with the gas comprises flowing the gas to the one or more electrode compartments during draining of the one or more electrode compartments until a pressure measured in the one or more electrode compartments indicates that the one or more electrode compartments are empty.

5. The method of claim 1, wherein completely draining the electrolytes from the one or more electrode compartments, purging the one or more electrode compartments, and refilling the one or more electrode compartments comprises draining, purging, and refilling a negative electrode compartment.

6. The method of claim 1, wherein completely draining the electrolytes from the one or more electrode compartments, purging the one or more electrode compartments, and refilling the one or more electrode compartments comprises draining, purging, and refilling each of a negative electrode compartment and a positive electrode compartment.

7. The method of claim 1, wherein refilling the one or more electrode compartments with the fresh electrolytes comprises replenishing the one or more electrode compartments with electrolytes having a lower pH and a lower iron hydroxide content than the electrolytes drained from the one or more electrode compartments.

8. The method of claim 1, wherein completely draining the electrolytes from the one or more electrode compartments, purging the one or more electrode compartments with the gas, and refilling the one or more electrode compartments with the fresh electrolytes are performed in sequence, and wherein refilling the one or more electrode compartments with the fresh electrolytes occurs periodically.

9. A method of operating a redox flow battery system, the method comprising:
switching the redox flow battery system to an idle mode, wherein the idle mode includes operation of the redox flow battery system outside of a charging mode and outside of a discharging mode;
responsive to a first threshold period of time elapsing while the redox flow battery system is in the idle mode, activating an electrolyte pump to circulate electrolyte through at least one electrode compartment of the redox flow battery system; and
responsive to a second threshold period of time elapsing while the redox flow battery system is in the idle mode, the second threshold period of time longer than the first threshold period of time,
completely draining the at least one electrode compartment, purging the at least one electrode compartment with a gas, and periodically refilling the at least one electrode compartment with fresh electrolyte.

10. The method of claim 9, further comprising initiating a first timer to monitor passage of time relative to the first threshold period of time and a second timer to monitor passage of time relative to the second threshold period of time,
wherein the first timer and the second timer are simultaneously initiated by switching of the redox flow battery system to the idle mode.

11. The method of claim 10, further comprising:
upon activating the electrolyte pump, initiating a third timer to monitor a third threshold period of time; and
deactivating the electrolyte pump after passage of the third threshold period of time.

12. The method of claim 11, wherein elapsing of the first and third threshold periods of time occur before the second threshold period of time elapses, and wherein the first timer is reset when the third threshold period of time elapses.

13. The method of claim 9, wherein activating the electrolyte pump in response to the first threshold period of time elapsing occurs one or more times during the second threshold period of time.

14. The method of claim 9, further comprising prioritizing draining, purging, and periodically refilling the at least one electrode compartment in response to the second threshold period of time elapsing over activating the electrolyte pump in response to the first threshold period of time elapsing when elapsing of the first and second threshold periods of time coincide.

15. The method of claim 9, wherein purging the at least one electrode compartment with the gas comprises flowing the gas through the at least one electrode compartment under oxygen-free conditions to flush the at least one electrode compartment with a target volume of the gas, and wherein the at least one electrode compartment comprises a negative electrode compartment and a positive electrode compartment.

16. The method of claim 15, further comprising halting the flowing of the gas through the at least one electrode compartment and periodically refilling the at least one electrode compartment when the target volume of the gas is attained.

* * * * *